(12) United States Patent
Bayense et al.

(10) Patent No.: US 7,351,393 B1
(45) Date of Patent: Apr. 1, 2008

(54) STAR SHAPED ALUMINA EXTRUDATES AND CATALYST BASED THEREON

(75) Inventors: Cornelis Roeland Bayense, Gameren (NL); Durk Ykema, De Meern (NL)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/830,907

(22) PCT Filed: Nov. 4, 1999

(86) PCT No.: PCT/NL99/00676

§ 371 (c)(1),
(2), (4) Date: Jun. 19, 2001

(87) PCT Pub. No.: WO00/25918

PCT Pub. Date: May 11, 2000

(30) Foreign Application Priority Data

Nov. 4, 1998 (EP) .................................. 98203719

(51) Int. Cl.
*C01F 7/02* (2006.01)

(52) U.S. Cl. ...................................... 423/625; 423/628

(58) Field of Classification Search ................ 423/625, 423/628; 502/355, 439, 503, 527.24, 527.14, 502/527.16

See application file for complete search history.

(56) References Cited

U.S. PATENT DOCUMENTS

| 3,673,079 | A | * | 6/1972 | Mulaskey et al. ...... 208/111.05 |
| 4,370,261 | A | * | 1/1983 | Wunder et al. ............. 502/328 |
| 4,554,268 | A | * | 11/1985 | Neel et al. .................. 502/439 |
| 5,372,620 | A | * | 12/1994 | Rowse et al. ................. 51/309 |
| 5,633,081 | A | * | 5/1997 | Clough et al. .............. 428/331 |
| 6,521,197 | B1 | * | 2/2003 | Kumberger et al. ..... 423/437.1 |

FOREIGN PATENT DOCUMENTS

| DE | 33 15 105 A | 11/1983 |
| EP | 0 004 079 A | 9/1979 |
| EP | 0 008 424 A | 3/1980 |
| EP | 0 020 963 A | 1/1981 |
| EP | 0 342 759 A | 11/1989 |
| WO | 92/05870 A | 4/1992 |

OTHER PUBLICATIONS

Kirk-Othmer, Third Ed., vol. 2, pp. 230-232, no date.
G. Sandstede et. al., Chem. Ing. Tech. 32 (1960), 413, no month.
J. Rouqueral et al., in Pure & Applied Chem. 66 (8) 1994, pp. 1752-1753, no month.

* cited by examiner

*Primary Examiner*—Edward M. Johnson
(74) *Attorney, Agent, or Firm*—Weingarten, Schurgin, Gagnebin & Lebovici LLP

(57) ABSTRACT

This invention is directed to star shaped alumina extrudates with a pore volume in the pores of a diameter over 1000 nm, as determined by mercury porosity, of at least 0.05 ml/g and a total pore volume between 0.5-0.75 ml/g. The extrudates have a length of between 2-8 mm, a length to diameter ratio of between 1-3, a side crushing strength of at least 50 N and a bulk crushing strength of at least 1 MPa.

20 Claims, 1 Drawing Sheet

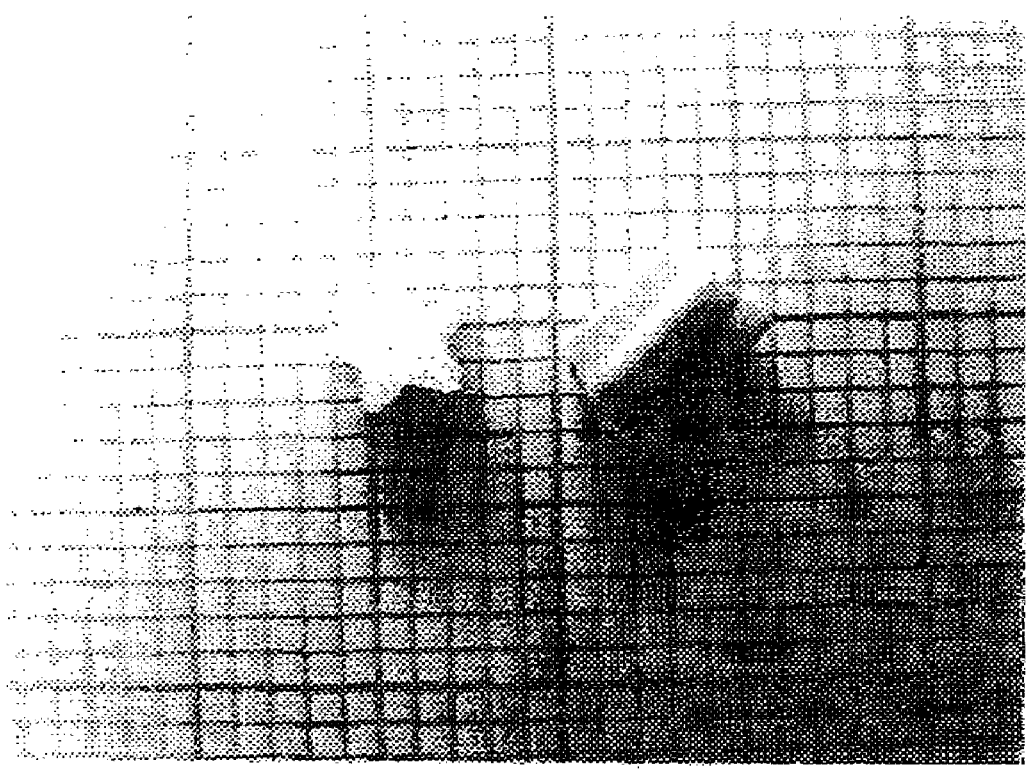

STAR SHAPED ALUMINA EXTRUDATES AND CATALYST BASED THEREON

The invention is directed to transition alumina extrudates, suitable as catalyst, or as catalyst support, and the use of such extrudates in chemical reactions.

In catalysis alumina plays an important role, both as a catalyst support and as catalytically active material. As is mentioned in Kirk-Othmer, Third Ed, Vol. 2, pages 230-232, alumina can be used as catalyst in a Claus process, for dehydration of alcohols, such as the production of olefins from alcohol, and the reverse reaction, but also for the isomerisation of olefins. As interacting catalyst support alumina may play a role in hydrorefining catalysts, e.g. in cobalt or nickel-molybdenum oxides on alumina.

As a support alumina is frequently used for precious metal catalyst, such as in exhaust catalysts or for (de)hydrogenation reactions. As support for a nickel catalyst it may be used in (de)hydrogenation reactions such as for fat and oils hydrogenation, for hydrogenation of fatty nitriles or of nitro aromatic compounds or for oligomerisation of olefins.

The structure of the support, i.e. the BET surface area, the pore size and the pore volume distribution, forms an important aspect of the alumina or alumina based catalyst. In view of activity and selectivity it would be highly desirable to have an alumina product that is on the one hand highly porous, i.e. having a large volume in large pores, and that has a good mechanical strength and stability. Unfortunately these are requirements that are difficult to reconcile with each other.

In fixed bed processes shaped bodies of alumina are frequently used. An important aspect therein is the shape dependency of the pressure drop. Tablets and extrudates are the materials commonly used in fixed bed applications. In order to minimise pressure drop, the use of star shaped extrudates would be most suitable. However, star shaped bodies, extrudates, tend to be prone to attrition due to the presence of the 'points' of the star.

EP-A-0 008 424 discloses star shaped desulfurization catalysts. Highly porous star shaped catalysts, having a good mechanical strength and stability are not disclosed.

It is an object of the invention to reconcile these various requirements in the form of a transition alumina extrudate, having a carefully balanced set of properties. Further objects and advantages will become clear from the following description of the invention and the preferred embodiments thereof.

BRIEF DESCRIPTION OF THE FIGURE

The FIGURE is a photograph showing two views of an extrudate.

The invention is based thereon that the inventors have now been able to provide a star shaped alumina extrudate, having on the one hand an optimal structure, as indicated above and on the other hand a good strength.

The invention is accordingly directed to star shaped alumina extrudates with a pore volume in pores of diameter of over 1000 nm, as determined by mercury porosimetry, of at least 0.05 ml/g, a side crushing strength of at least 50 N and a bulk crushing strength of at least 1 MPa.

Surprisingly, this set of properties can be made available in one material, thereby providing a material with which chemical reactions can be made much more efficient, resulting in higher activity and/or selectivity. Also the material of the invention, when used in fixed bed reactors, provides a decreased pressure drop compared to regular extrudates having a cylindrical shape.

The BET surface area, as determined by single point adsorption using the BET equation (as e.g. described by G. Sandstede et. al., Chem. Ing. Tech. 32 (1960), 413), should be at least 10 $m^2$/g of alumina. This coincides with the requirement of using a transition alumina, i.e. not an $\alpha$ alumina. Suitable alumina's are the various transition alumina's including $\gamma$-alumina, $\delta$-alumina, $\epsilon$-alumina, $\kappa$-alumina, $\zeta$-alumina, $\theta$-alumina and $\tau$-alumina. These alumina's have a large BET-surface area, generally in the range of 25 up to more than 100 $m^2$/g.

The pore volume is a further important requirement, whereby it is on the one hand important that the total pore volume, as determined by mercury intrusion is sufficiently high and on the other hand that the pore volume in pores of over 1000 nm forms a substantial portion of the total pore volume. In absolute terms the total pore volume should be at least 0.50 ml/g, whereas the ratio of the pore volume in pores of over 1000 nm to total pore volume should preferably be more than 0.04. An alumina having those properties has good properties in terms of reactant accessibility, which makes it very suitable for all kinds of catalytic reactions requiring good diffusion of reactants and products through the alumina, thereby eliminating diffusion limitation problems as much as possible.

The pore volume and pore size distribution are determined by mercury porosimetry measurements, as described by J. Rouquerol et al in Pure & Applied Chem., 66(8), 1994, pages 1752-1753, using the Washburn equation.

As indicated above, the use of star shaped extrudates is important in terms of pressure drop in relation to accessibility of the internal surface of the alumina. This also plays a role in eliminating diffusion problems. Star shaped extrudates can be defined as objects having some kind of central part or core, with three or more triangularly shaped extensions on the circumference thereof. Most preferred are star shaped extrusions having five extensions, as this provides the optimal balance between strength, porosity, pressure drop and accessibility. Another advantageous property of the star shaped extrudates is the fact that the ratio of external surface area to volume is more advantageous than in the case of conventional cylindrical extrudates or tablets.

The ratio of the length of the extrudates to the diameter is preferably between 1 and 3, whereby as diameter the distance is meant between two parallel planes on either side of the extrudate.

Important aspects of the material of the invention are also the strength characteristics. As indicated above a side crushing strength of at least 50 N and a bulk crushing strength of at least 1 MPa are essential herein. These parameters form the basis for the suitability of the extrudates for use in large scale reactors, like in the petroleum industry. When the extrudates meet these requirements, they can be used in huge fixed bed reactors, that require very strong material. The side crushing strength and the bulk crushing strength is defined as follows:

The side crushing strength (SCS) of extrudates is defined as the pressure (in Newtons) at which extrudates of 4.5-5.00 nm length are crushed, when treated under pressure between two flat plates on a AIKOH, 9500 series tester.

The bulk crushing strength (BCS) of a catalyst is defined as the pressure (in Megapascals) at which 0.5% fines (i.e. particles less than 0.425 mm) are formed when treated under a piston in a tube. For that purpose, 17 ml of catalyst particles, presieved on a 0.425 mm sieve, are loaded in a cylindrical sample tube (diameter 27.3 mm), and 8 ml steel beads is loaded on top. The catalyst is subsequently treated at different (increasing) pressures for three minutes, after which the fines are recovered and their percentages is determined. This procedure is repeated until a level of 0.5 wt. % fines is reached.

Another aspect of the strength of the material is the attrition, i.e. the amount of material that may break off of the extrudates upon use. This attrition, determined in accordance with ASTM D4058-87, should preferably be less than 5 wt. %, more in particular less than 3 wt. %.

The alumina extrudates having the above properties can be prepared by mixing transition alumina powder with a suitable binder in the presence of a liquid, usually water or an aqueous solution of a mineral acid such as hydrochloric, sulfonic or nitric acid, to form a paste, followed by extruding of the paste in the required star form, using a suitable die and cutting the extruded strands of material to the required length. Optionally after drying, the extrudates are calcined.

It is possible to use various types of binder materials, such as those based on silica or alumina. Examples are colloidal silica, waterglass, or clays. It is preferred to use an alumina based binder or a binder that is removed during calcination, while providing and maintaining the required strength. An example of a suitable binder system is an alumina binder that gels under acidic treatment, for example by using organic or inorganic acids. The amount of binder material used in the preparation of the paste that is to be extruded will vary depending on the type of material and the required strength. Generally it will not be in excess of 30 wt. % based on the dry weight of binder and alumina together.

The invention will now be elucidated on the basis of an example.

EXAMPLE 1.5 kg of aluminium trihydrate, containing 65 wt. % of $Al_2O_3$, with an average particle size of 30-50 μm is mixed with 0.4 kg of alumina binder. The powders are mixed extensively while slowly adding diluted, aqueous $HNO_3$ in an amount of 2 wt. %, calculated on the weight of the total amount of alumina.

Thereby the alumina binder is peptised. Mixing is continued until a relatively dry product is obtained. the intermediate product is extruded using a one-screw extruder, equipped with a die having starshaped holes and a cutting device.

The extrudates obtained are dried at 105° C. for 16 hours and subsequently calcined at 850° C. for one hour. Attached are two figures with photographs of an extrudate shown from two different angles.

The final product has been analysed for its physical properties with the following result:

$N_2$-BET surface area 106 m/g$^2$
Total Hg pore volume 0.56 ml/g
Pore volume in pores over 1000 nm 0.07 ml/g
Side crushing strength 65 N
Bulk crushing strength 1.08 MPa

The invention claimed is:

1. A star shaped alumina extrudate comprising pores, wherein the pore volume in pores of diameter over 1000 nm as determined by mercury porosimetry is at least 0.05 ml per gram of unit mass of said extrudate, the extrudate having a side crushing strength of at least 50 N and a bulk crushing strength of at least 1 Mpa.

2. The extrudate according to claim 1, having a length of between 2 and 8 mm.

3. The extrudate according to claim 1, having a length to diameter ratio of between 1 and 3.

4. The extrudate according to claim 1, wherein the total pore volume as determined by mercury porosimetry is between 0.05 and 0.75 ml/g.

5. The extrudate according to claim 1, wherein the BET surface area is at least 75 m$^2$/g.

6. The extrudate according to claim 1, wherein attrition, as determined by ASTM D4058-87, is less than 5 wt. %.

7. A catalyst comprising at least one catalytically active material supported on an extrudate according to claim 1.

8. The catalyst according to claim 7, wherein the catalytically active material is selected from the group of metals, metal oxides, metal sulfides and combinations thereof.

9. An extrudate according to claim 2, having a length to diameter ratio of between 1 and 3.

10. An extrudate according to claim 9, wherein:
the total pore volume as determined by mercury porosimetry is between 0.5 and 0.75 ml/g;
the BET surface area is at least 75 m$^2$/g; and
the attrition, as determined by ASTM D4058-87, is less than 5 wt. %.

11. The catalyst of claim 7, wherein said catalytically active material is supported on an extrudate according to claim 2.

12. The catalyst of claim 7, wherein said catalytically active material is supported on an extrudate according to claim 3.

13. The catalyst of claim 7, wherein said catalytically active material is supported on an extrudate according to claim 4.

14. The catalyst of claim 7, wherein said catalytically active material is supported on an extrudate according to claim 5.

15. The catalyst of claim 7, wherein said catalytically active material is supported on an extrudate according to claim 6.

16. The extrudate of claim 6, wherein said attrition is less than 3 wt. %.

17. The extrudate of claim 10, wherein said attrition is less than 3 wt. %.

18. The extrudate of claim 1, wherein a fraction of the total pore volume per unit mass attributable to pores of diameter over 1000 nm is greater than 4%.

19. The extrudate of claim 4, wherein a fraction of the total pore volume per unit mass attributable to pores of diameter over 1000 nm is at least about 7%.

20. The extrudate of claim 1, wherein the ratio of the pore volume in pores of diameter over 1000 nm to total pore volume is more than 0.04.

* * * * *

UNITED STATES PATENT AND TRADEMARK OFFICE
CERTIFICATE OF CORRECTION

| | | |
|---|---|---|
| PATENT NO. | : 7,351,393 B1 | Page 1 of 1 |
| APPLICATION NO. | : 09/830907 | |
| DATED | : April 1, 2008 | |
| INVENTOR(S) | : Cornelis Roeland Bayense et al. | |

It is certified that error appears in the above-identified patent and that said Letters Patent is hereby corrected as shown below:

Column 2, line 61, "nm length" should read --mm length--.

Signed and Sealed this

Twenty-second Day of September, 2009

David J. Kappos
*Director of the United States Patent and Trademark Office*